United States Patent Office 2,891,944
Patented June 23, 1959

2,891,944

METHOD FOR THE PREPARATION OF SUBSTITUTED SORBITYLUREAS

Fred E. Boettner, Philadelphia, Pa., assignor to Rohm & Haas Company, Philadelphia, Pa., a corporation of Delaware No Drawing. Application March 20, 1957
Serial No. 647,210

10 Claims. (Cl. 260—211)

This invention relates to specific substituted sorbitylureas as new compositions of matter and to a method for their preparation.

The present invention is concerned with the reaction between the cyclic urethane of N-methyl-N-sorbitylcarbamic acid and a compound having the formula $RNH_2$, in which R may represent a hydrogen atom or a hydrocarbon group, preferably of one to eighteen carbon atoms. This $RNH_2$ compound may be defined as one in which there are at least two hydrogen atoms on the nitrogen thereof. The reaction may be conducted with or without a solvent.

Typical of the compounds having the formula $RNH_2$, as defined above, that may be employed are ammonia; primary alkylamines such as methylamine, ethylamine, propylamine, butylamine, pentylamine, hexylamine, octylamine, decylamine, undecylamine, dodecylamine, tetradecylamine, and octadecylamine; primary alkenylamines such as allylamine, butenylamine, pentenylamine, hexenylamine, octenylamine, decenylamine, dodecenylamine, octadecenylamine; primary alkynylamines such as propynylamine, octynylamine, dodecynylamine and octadecynylamine; and primary arylamines, arylalkylamines, and alkylarylalkylamines such as aniline, naphthylamine, benzylamine, phenylethylamine, hexylphenylbutylamine, and octylbenzylamine. R must be thermally stable at the contemplated reaction temperatures. Actually, many other compounds containing a primary amino structure will react according to the present invention, such as ethylenediamine, diethylenetriamine, hexamethylenediamine, $\alpha,\omega$-diaminodecane, and others. The requirement of vital significance is that a primary amino structure be present, preferably along with R as defined above with one to eighteen carbon atoms. When R' is hydrogen a disubstituted urea product is obtained, whereas when R is one of the defined hydrocarbon groups having one to eighteen carbon atoms a trisubstituted urea product is obtained which is significantly distinct from the disubstituted urea product in properties and applications. Ammonia, the primary alkylamines, and the primary alkenylamines perform somewhat more readily than the other reactants set forth above, and, therefore, they are the preferred reactants.

The other reactant, the cyclic urethane of N-methyl-N-sorbitylcarbamic acid, is prepared by reacting N-methylglucamine with urea according to the method shown in my copending application Serial No. 451,045 filed August 19, 1954, now United States Patent No. 2,834,775. The cyclic urethane of N-methyl-N-sorbitylcarbamic acid may be prepared, according to my copending application previously referred to, in the following way. Parts by weight are employed in all instances.

PREPARATION

There were added to a reaction vessel 90 parts of N-methylglucamine and 30 parts of urea. The mixture was heated to 130° to 150° C. for about four and a half hours. At the end of the reaction the reaction mixture was cooled and a solid product crystallized on standing. The crystalline solid was recrystallized from 2B benzene denatured alcohol and dried. The product had a melting range of 145° to 148° C. and gave an analysis of 43.3% carbon (43.4% theoretical), 7.0% hydrogen (6.78% theoretical), and 6.7% nitrogen (6.33% theoretical). The product was identified as the cyclic urethane of N-methyl-N-sorbitylcarbamic acid.

The present reaction may be carried out with or without a solvent, as desired. If a solvent is desired any inert volatile solvent, organic or inorganic, may be used. It is frequently advantageous to employ a solvent in order to assure intimate chemical proximity of the reactants and to obtain maximum heat transfer benefits. Among the suitable readily-available inexpensive solvents that may be used are dimethylformamide and water. Dimethylformamide is a good solvent for both of the reactants. Water is a good solvent for the cyclic urethane, ammonia, and the lower amines. While water is only a fair solvent for the higher amines it forms emulsions with these higher amines and these emulsions satisfactorily supply the advantages of a solvent. Frequently, an aqueous solution of dimethylformamide is employed with very satisfactory results.

In many cases there is no need for an additional solvent since many of the amines, as well as aqueous ammonia, serve as both reactants and solvents. When ammonia is employed it is desirable to use the standard reagent solution which contains about 28% ammonia, the remainder being water. Such an aqueous solution of ammonia serves very well as both a reactant and a solvent. It is also possible to conduct the reaction in such a way that a solvent is not desired. For instance, it is quite satisfactory to conduct the reaction at such a temperature that the otherwise solid cyclic urethane reactant becomes molten. The other solid reactants usually melt at temperatures below that of the cyclic urethane so that a molten reaction mixture results. It is even feasible to use the cyclic urethane reactant in the molten state when the other reactant is gaseous, such as in the case of methylamine, ethylamine, and anhydrous ammonia. The gaseous reactant may be introduced by bubbling it up through the molten cyclic urethane, preferably in a system under pressure, with quite satisfactory results. In summation, it is apparent that the use of a solvent is not of critical significance, but in many instances it is convenient to employ one.

The present reaction may be conducted in the range of temperatures from about 20° to 150° C., if no solvent is used, and from about 20° C. to the reflux temperature of the reaction mixture, if a solvent is employed. Temperatures appreciably below 20° C. result in a sluggish reaction at best and usually give a negligible effect, and therefore such temperatures are usually avoided. In most cases, the reaction proceeds at a somewhat more rapid rate at the higher temperaures in the above defined temperature ranges.

Atmospheric pressures are preferably used in the instant reaction, although pressures above atmospheric may be somewhat advantageous in the case of gaseous reactants. This is a matter of choice.

The present reaction is usually conducted from about one to eight hours or more, as desired, depending on the reactants employed, the temperautres used, and the use or non-use of a solvent. Using the descriptions set forth above there is consistently obtained yields greater than 90% without the need or help of a catalyst.

The products formed in this reaction are usually clear to white crystalline solids. They are readily isolable either by filtration or by evaporation procedures, if a solvent is employed. Or otherwise, since the yield is consistently quite high, only recrystallization from a suitable solvent is needed. Usually, in any case, the product is purified by recrystallization. These products are valuable as insecticides, solvents, and as agents for supplying rewetting properties to wet strength resins in the paper industry.

This application is a continuation-in-part of my application Serial No. 466,220, filed November 1, 1954, now abandoned.

The method of preparing sorbitylureas, according to the present invention, is shown in the following illustrative examples in which parts by weight are used throughout.

Example 1

Into a three-necked, round bottom flask equipped with a thermometer, stirrer, and reflux condenser, there were placed ten parts of the cyclic urethane of N-methyl-N-sorbitylcarbamic acid and 8.4 parts of dodecylamine. The two solid reactants were mixed while dry and then heated to 70° C. until they became molten. Distilled water, in the amount of 25 parts, was added to the flask and the reaction mixture became gelatinous. There was then added to the flask 50 parts of dimethylformamide. The reaction mixture was heated in the range of 70° to 80° C. for four and a half hours. At the end of the reaction period the system was allowed to cool to room temperature. The reaction mixture separated into two layers and was concentrated under reduced pressure on a steam bath to give a white waxy solid. This solid product was recrystallized from 2B benzene denatured alcohol giving a microcrystalline solid having a melting range of 160°–169° C. The purified product gave a nitrogen analysis of 7.0% (6.9% theoretical) and was identified as N-methyl-N-sorbityl-N'-dodecylurea.

Example 2

There were added together in a reaction vessel 36.5 parts of butylamine and 110.6 parts of the cyclic urethane of N-methyl-N-sorbitylcarbamic acid. The system was heated to reflux for two hours and then allowed to return to room temperature. The product was purified by recrystallization and identified as N-methyl-N-sorbityl-N'-butylurea.

Similarly there was prepared N-methyl-N-sorbityl-N'-butenylurea, substituting butenylamine for the butylamine above.

Example 3

A mixture of 28.5 parts of allylamine and 110.6 parts of the cyclic urethane of N-methyl-N-sorbitylcarbamic acid was added to a reaction vessel and heated to 40° to 50° C. for six hours. The product was removed from the reaction vessel and purified by recrystallization. The product was identified as N-methyl-N-sorbityl-N'-allylurea.

In like manner there was made N-methyl-N-sorbityl-N'-methallylurea upon substituting methallylamine for the above allylamine.

Example 4

There were introduced into a reaction vessel five parts of the cyclic urethane of N-methyl-N-sorbitylcarbamic acid and 50 parts of aqueous ammonia (28% ammonia). The cyclic urethane immediately dissolved in the aqueous ammonia. The reaction solution was allowed to stand for one hour at room temperature (25° to 28° C.) and then 500 parts of 2B benzene denatured alcohol was added thereto. The solution was then concentrated under reduced pressure on a steam bath. The product was separated and gave a melting range of 136° to 140° C. The yield of product was 100% of the theoretical amount. The product was identified as N-methyl-N-sorbitylurea.

In a similar way there was prepared N-methyl-N-sorbityl-N'-methylurea, utilizing aqueous methylamine solution in place of ammonium hydroxide solution above.

But, it should be noted, there is an interesting difference in the character of the respective products, since ammonia yields a urea lacking the N'-substituent, the absence or presence of which causes a marked change in the nature of the products.

Example 5

A mixture of 135 parts of octadecylamine and 110.5 parts of the cyclic urethane of N-methyl-N-sorbitylcarbamic acid was added to a reaction vessel and melted by applying heat until the temperature rose to 70° C. There was then added 350 parts of water and 75 parts of dimethylformamide. The reaction mixture was heated to reflux for two hours, after which time the temperature of the system was allowed to return to room temperature. The product was filtered off, recrystallized, and dried. The product was identified as N-methyl-N-sorbityl-N'-octadecylurea.

In like manner there was prepared N-methyl-N-sorbityl-N'-octadecenylurea from octadecenylamine and the cyclic urethane of N-methyl-N-sorbitylcarbamic acid.

Example 6

There were added to a reaction vessel 92 parts of dodecenylamine, 110.5 parts of the cyclic urethane of N-methyl-N-sorbitylcarbamic acid, and 100 parts of dimethylformamide. The system was heated to the reflux temperature and maintained at that level for two hours. At the end of that time the reaction mixture was allowed to cool to room temperature. The product was separated and purified by recrystallization. The product was identified as N-methyl-N-sorbityl-N'-dodecenylurea.

In a similar way, N-methyl-N-sorbityl-N'-octylurea was prepared from octylamine and the cyclic urethane of N-methyl-N-sorbitylcarbamic acid.

Example 7

A mixture of 53.5 parts of benzylamine and 110.5 parts of the cyclic urethane of N-methyl-N-sorbitylcarbamic acid was added to a reaction vessel and heated to reflux to three hours. At the end of the three hour period of refluxing the reaction mixture was allowed to cool to room temperature. The product was separated, purified by recrystallization, and identified as N-methyl-N-sorbityl-N'-benzylurea.

In a similar way, there was prepared N-methyl-N-sorbityl-N'-octynylurea, starting with the acetylenic amine and the cyclic urethane of N-methyl-N-sorbitylcarbamic acid.

Example 8

There were placed 36.4 parts of dodecyenylamine and 44.2 parts of the cyclic urethane of N-methyl-N-sorbitylcarbamic acid in a flask equipped with a stirrer, reflux condenser, and thermometer. Dimethylformamide (100 parts) was added and the mixture was heated with stirring to 80° C. for four hours. The dimethylformamide was removed by heating under reduced pressure and the product was purified by recrystallization from alcohol. It was identified as N-methyl-N-sorbityl-N'-dodecenylurea.

Example 9

There were added together in a reaction vessel 22.1 parts of the cyclic urethane of N-methyl-N-sorbitylcarbamic acid, 12.7 parts of octenylamine, and 100 parts of dimethylformamide. The mixture was heated with stirring to 80° C. for a period of four hours. The reaction mixture was then subjected to reduced pressure and heat to remove the dimethylformamide. The residue was recrystallized from alcohol and identified as N-methyl-N-sorbityl-N'-octenylurea.

Example 10

A mixture of 9.3 parts of aniline, 221 parts of the cyclic urethane of N-methyl-N-sorbitylcarbamic acid, and 300 parts of dimethylformamide were placed in a suitable reaction vessel. The mixture was heated with stirring to 70° to 80° C. for a period of six hours. After this time the dimethylformamide was removed by distillation under reduced pressure. The residue was purified by recrystallization from aqueous alcohol and identified as N-methyl-N-sorbityl-N'-phenylurea.

*Example 11*

A mixture of p-tert-octylbenzylamine (44 parts) and the cyclic urethane of N-methyl-N-sorbitylcarbamic acid (44 parts) were placed in a reaction vessel along with 100 parts of dimethylformamide and 100 parts of water. This mixture was then heated to reflux for three hours and cooled. The reaction mixture was heated under reduced pressure to remove the water and dimethylformamide. The product was recrystallized from anhydrous alcohol and identified as N-methyl-N-sorbityl-N'-p-tert-octylbenzylurea.

I claim:

1. A method for the preparation of substituted sorbitylureas which comprises reacting in the temperature range of about 20° to 150° C. the cyclic urethane of N-methyl-N-sorbitylcarbamic acid with a compound having the formula $RNH_2$, in which R is a member from the class consisting of a hydrogen atom and alkyl, alkenyl, alkynyl, aryl, arylalkyl, and alkylarylalkyl groups of one to eighteen carbon atoms.

2. A method for the preparation of substituted sorbitylureas which comprises reacting, in the presence of an inert volatile solvent and at a temperature in the range of about 20° C. to the reflux temperature of the reaction mixture, the cyclic urethane of N-methyl-N-sorbitylcarbamic acid with a compound having the formula $RNH_2$ in which R is a member from the class consisting of a hydrogen atom and alkyl, alkenyl, alkynyl, aryl, arylalkyl, and alkylarylalkyl groups of one to eighteen carbon atoms.

3. A method for the preparation of substituted sorbitylureas which comprises reacting in the temperature range of about 20° to 150° C. the cyclic urethane of N-methyl-N-sorbitylcarbamic acid with a primary monoamine having the formula $RNH_2$ in which R is an alkyl group of one to eighteen carbon atoms.

4. A method for the preparation of substituted sorbitylureas which comprises reacting, in the presence of an inert volatile solvent and at a temperature in the range of about 20° C. to the reflux temperature of the reaction mixture, the cyclic urethane of N-methyl-N-sorbitylcarbamic acid with a primary monoamine having the formula $RNH_2$ in which R is an alkyl group of one to eighteen carbon atoms.

5. A method for the preparation of substituted sorbitylureas which comprises reacting in the temperature range of about 20° to 150° C. the cyclic urethane of N-methyl-N-sorbitylcarbamic acid with a primary monoamine having the formula $RNH_2$ in which R is an alkenyl group of three to eighteen carbon atoms.

6. A method for the preparation of substituted sorbitylureas which comprises reacting, in the presence of an inert volatile solvent and at a temperature in the range of about 20° C. to the reflux temperature of the reaction mixture, the cyclic urethane of N-methyl-N-sorbitylcarbamic acid with a primary monoamine having the formula $RNH_2$ in which R is an alkenyl group of three to eighteen carbon atoms.

7. A method for the preparation of a substituted sorbitylurea which comprises reacting, in the presence of an inert volatile solvent and at a temperature in the range of about 20° C. to the reflux temperature of the reaction mixture, the cyclic urethane of N-methyl-N-sorbitylcarbamic acid with methylamine.

8. A method for the preparation of a substituted sorbitylurea which comprises reacting, in the presence of an inert volatile solvent and at a temperature in the range of about 20° C. to the reflux temperature of the reaction mixture, the cyclic urethane of N-methyl-N-sorbitylcarbamic acid with ammonia.

9. A method for the preparation of a substituted sorbitylurea which comprises reacting, in the presence of an inert volatile solvent and at a temperature in the range of about 20° C. to the reflux temperature of the reaction mixture, the cyclic urethane of N-methyl-N-sorbitylcarbamic acid with dodecylamine.

10. A method for the preparation of a sorbitylurea which comprises reacting in the temperature range of about 20° to 150° C. the cyclic urethane of N-methyl-N-sorbitylcarbamic acid with benzylamine.

References Cited in the file of this patent

UNITED STATES PATENTS

| | | |
|---|---|---|
| 2,139,697 | Salzberg | Dec. 13, 1938 |

FOREIGN PATENTS

| | | |
|---|---|---|
| 833,816 | Germany | Mar. 13, 1952 |

OTHER REFERENCES

Wagner et al.: "Synthetic Organic Chem.," 1953, published by John Wiley & Sons, Inc. (N.Y.), pages 566, 567 and 647.